May 2, 1939. A. C. LINDGREN ET AL 2,156,571
IMPLEMENT ATTACHMENT FOR TRACTORS
Original Filed July 17, 1937  3 Sheets-Sheet 1
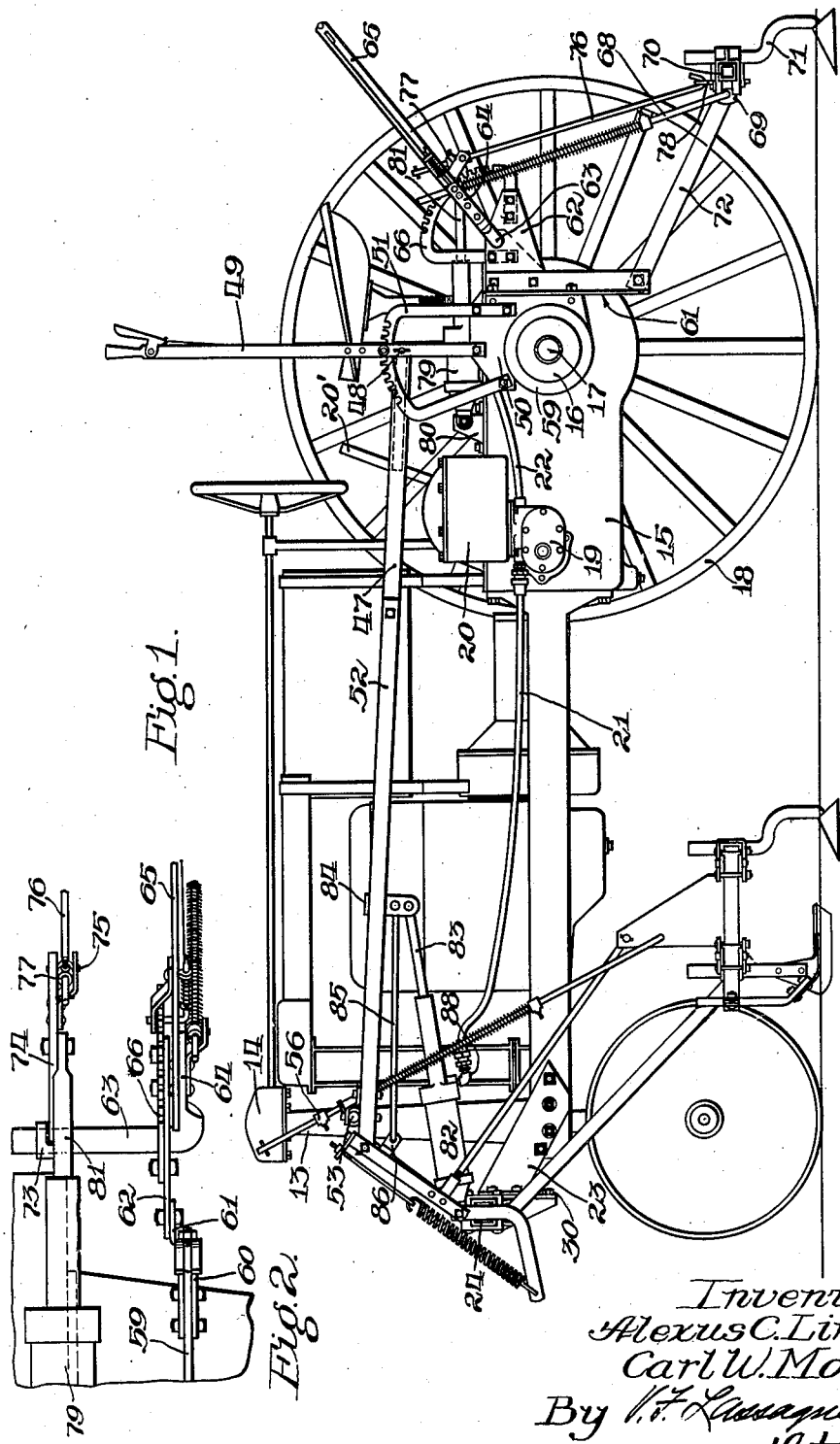
Inventors
Alexus C. Lindgren
Carl W. Mott.
By V. F. Larrague
Att'y.

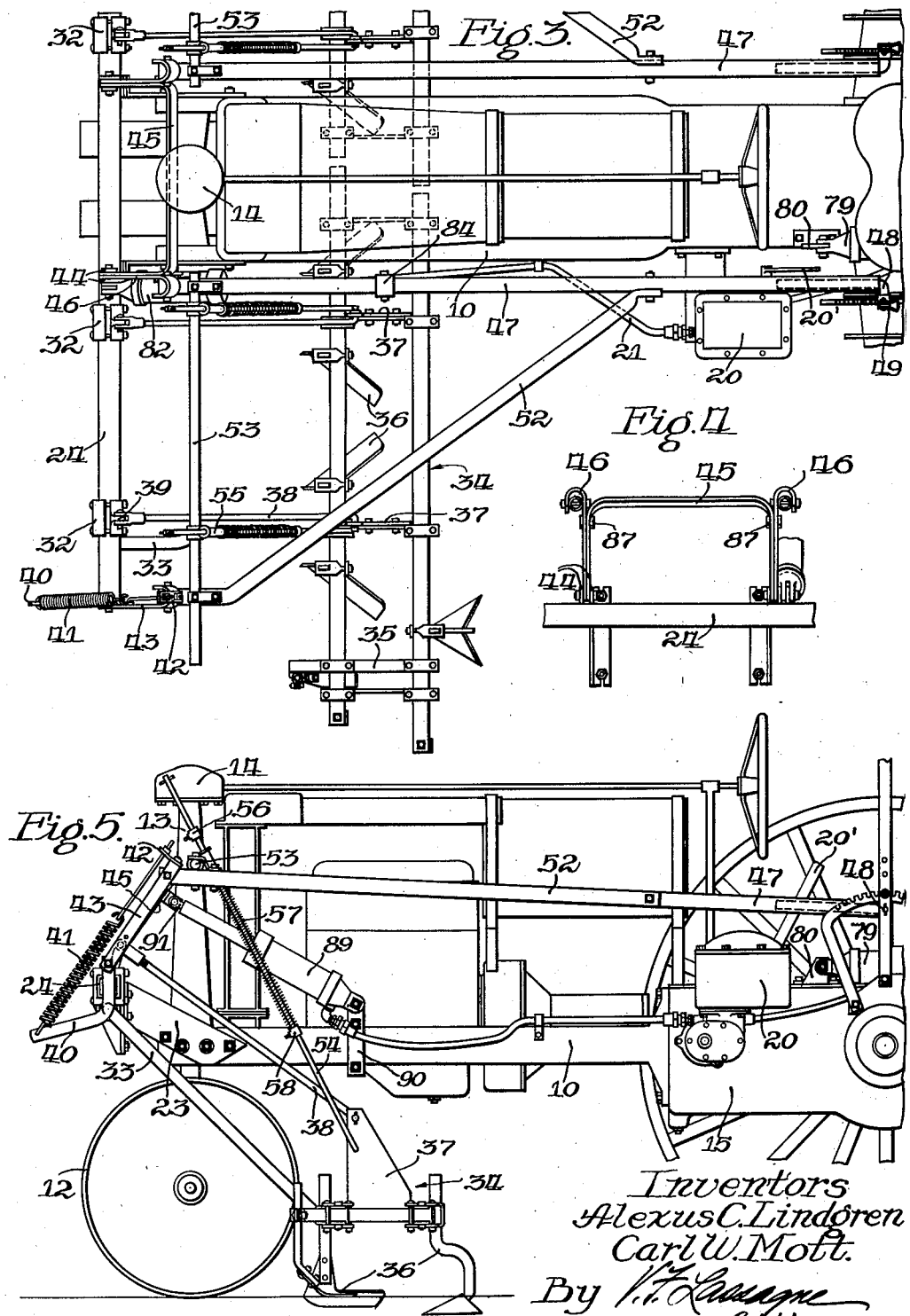

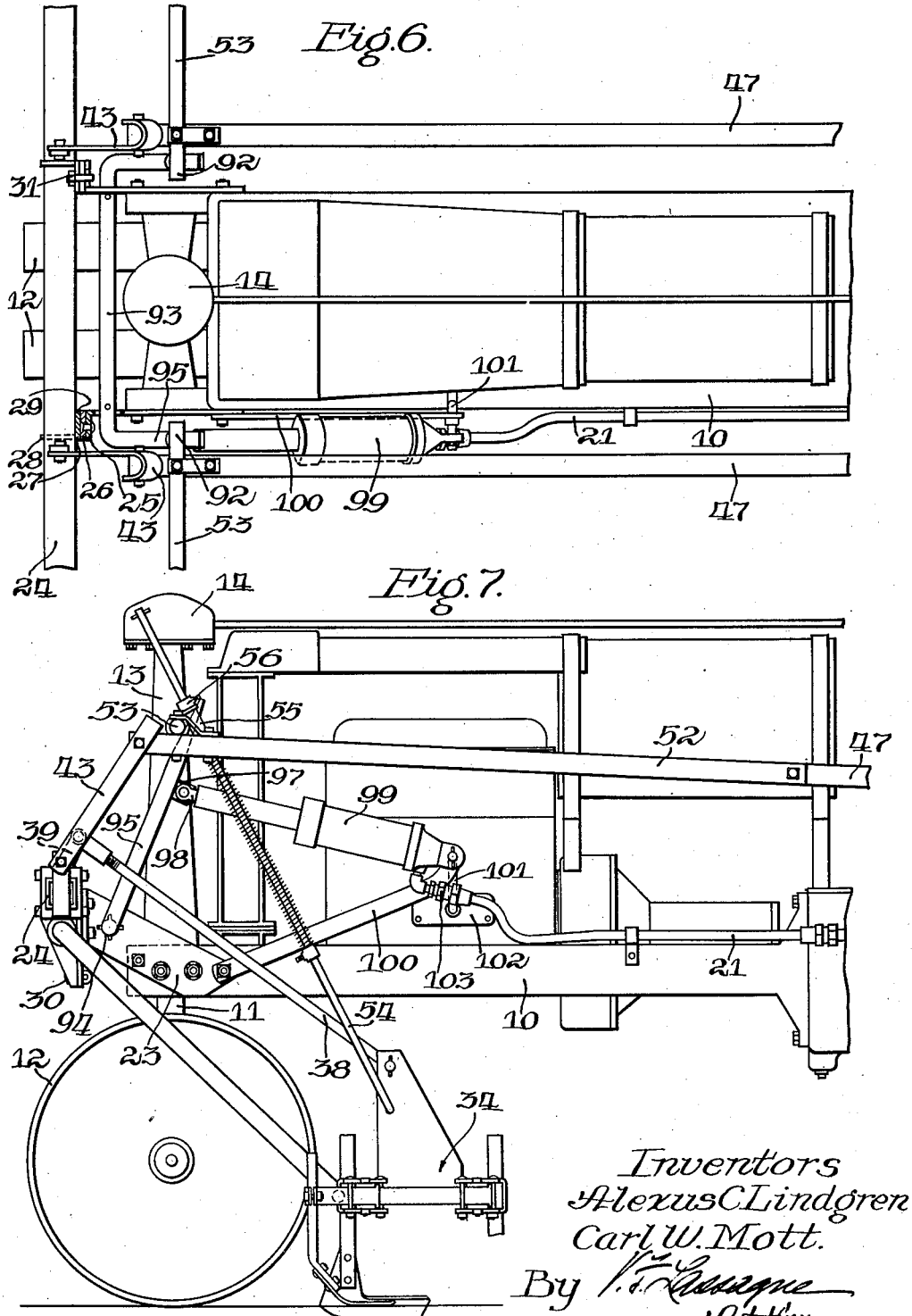

Patented May 2, 1939

2,156,571

UNITED STATES PATENT OFFICE 2,156,571

IMPLEMENT ATTACHMENT FOR TRACTORS

Alexus C. Lindgren, Chicago, and Carl W. Mott, Rock Falls, Ill., assignors to International Harvester Company, a corporation of New Jersey Application July 17, 1937, Serial No. 154,228
Renewed October 22, 1938

18 Claims. (Cl. 97—59)

This invention relates to a tractor attached implement. More specifically, it relates to the lifting connections for an implement mounted on a tractor and to power lift actuation of said connections.

A principal object of the invention is to construct improved implement lifting, lowering, and depth adjusting means for implements carried directly on a tractor of the general purpose type.

Another principal object is to provide an improved, simplified lifting mechanism for simultaneously lifting and lowering implements at opposite sides of a tractor.

Another important object is to provide manual lifting and depth adjusting means within reach of the operator independent of the power actuated lifting means.

Another more specific object is to provide a single lifting member at the front of a tractor constructed to engage and lift implements at opposite sides of the tractor.

Another important object is the construction of a power lift device and lifting connections thereto connected only to the tractor and to elements permanently associated therewith whereby the implement may be removed from the tractor without removing or adjusting the power lift connections.

The above objects and others which will be apparent from the detailed description to follow are accomplished by pivotally mounting a lifting member at the front of the tractor, said member having portions at each side of the tractor constructed to engage independent lifting connections on the implements at each side of the tractor. The connections are so constructed that each implement may be independently raised and adjusted by the manual lifting connections which extend to the rear of the tractor adjacent the operator's station. The specific means by which the independent manual adjustment is accomplished consists of a stop engaged by a longitudinal bar at the side of the tractor. Said stop may be manually adjusted and remains in this position during power lifting with the longitudinal bar moving away from the stop. The bar is retained in position by a telescopic arrangement of parts.

To provide for removing the implement without affecting the power lift mechanism, which is a feature coming into wide use at the present time, the lifting member and the power lift connections are secured to the tractor and to parts permanently secured thereto. The lifting connections for the implement are carried on the frame structure which supports the implement. By means of this construction it is not necessary to remove any part of the power lift mechanism when the implement is removed from the tractor.

In the drawings:

Figure 1 is a side elevation of a tractor of the general purpose type illustrating the invention by means of front and rear implements and a power lift device connected to the implements;

Figure 2 is an enlarged plan view of a portion of the tractor rear axle housing, showing the connections and adjusting means used on the rear implement;

Figure 3 is a plan view of the construction shown in Figure 1;

Figure 4 is a front elevation, showing the implement supporting frame at the center of the tractor and the lifting connections associated therewith;

Figure 5 is a side elevation, showing a modified form of lifting construction and connections;

Figure 6 is a plan view of a portion of the tractor, showing the same construction as Figure 5; and, Figure 7 is a side elevation of a tractor, showing another modified lifting construction.

In the drawings a general purpose tractor is illustrated to show implements mounted in a position to be lifted and lowered and to illustrate the power lifting connections forming the invention. The same tractor parts are shown in the three different modifications illustrated. The same numerals will be used for all parts of the tractor and other parts, such as the implement beams, which are common to the different forms of the device.

The tractor is of the narrow body type having side frame members 10 and a steerable front truck having a steering column 11 and wheels 12 carried thereby. The column 11 extends upwardly into a housing 13, which carries gearing in a housing 14 mounted at the top thereof for steering the tractor. A transmission and differential housing 15 is connected to the side frame members 10. Laterally extending axle housings 16 form a support for axles 17, which carry traction wheels 18.

At the side of the transmission 15, a fluid pump housing 19 is connected over an opening, through which a drive shaft extends for operating a fluid pump in the housing. These parts have not been illustrated in detail, as they form no part of the present invention and as fluid pumps of this type and control mechanism therefor are well known in the prior art. A control housing 20 is mounted above the housing 19, said housing including a control 20'. Fluid conduits 21 and 22, connected to the housing 19, extend to the front and rear lifting cylinders. It is to be understood that the valve arrangement may be of any desired construction providing for supplying fluid under pressure to either or both of the conduits 21 and 22 and for relieving pressure when it is desired to lower the implements.

A pair of forwardly extending plates 23, connected to the side frame members 10 of the tractor at the front end, provide means for attaching a transversely extending implement support 24. Said support extends laterally beyond each side of the tractor for supporting cultivators, as illustrated, or other implements, at the sides of the tractor.

The support, which is in the form of a pipe square in cross section, is removably connected to the plates 23 by a construction to enable the operator to quickly remove the implement from the tractor. The plates 23 are formed at their forward ends with outwardly extending, vertical flanges 25. Vertical plates 26 are secured by rivets to the flanges 25, extending a substantial distance below the flanges, as shown in the side elevation drawings. Attaching brackets 27 are welded to the support 24 to form means for connecting the pipe to the plates 26. The brackets 27 have a vertical portion 28 notched out to fit around the pipe, which is welded to the brackets. The brackets also include vertical portions 29, which fit against the forward faces of the plates 26, being secured thereto by bolts 30 at their lower ends and bolts 31 at their upper ends. By the use of this construction the implement may be quickly removed from the tractor by removing the bolts 30 and 31 and thereby removing the implement and its attaching frame structure as a unit.

By means of clamps in the form of castings 32, a plurality of implement beams 33 are secured to the support 24. The implement beams are pivotally secured in the implement illustrated to transversely extending tool bars 34. Said tool bars are a part of a frame structure including longitudinal frame members 35. A plurality of earth working tools 36 are supported on said frame structure. Details of this construction have not been shown and the construction has not been specifically described, as any conventional implement may be utilized within the scope of the invention. Upwardly extending plates 37, connected to the tool supporting bars 34, are connected by links 38 to upstanding brackets 39 formed integrally with the castings 32. This construction is provided to form a substantially parallel lift for the tool bars, it being understood that the beams 33 are also pivoted to the frame structure formed by the tool bars 34 and associated parts. It will be noted in the tractor illustrated that a single frame structure for supporting implements has been shown at each side of the tractor, being supported by two beams 33. Independent implements may be carried by the beams 33, and other types of construction may be utilized. These illustrated have been shown only to illustrate an implement for use with the lifting connections which constitute the invention.

In the modifications shown in Figures 1 to 5, inclusive, a member 40 is shown secured to the end of the support 24. Said member is extended forwardly to form an attaching arm for a tension spring 41. Said spring is connected to a bracket 42 mounted at the upper end of a lever 43. Said lever is pivoted on the upwardly extending end portion of the member 40. The spring 41 acts as a balancing spring during lifting of the implement. The lifting connection with the lever 43 will be described later.

Adjacent the tractor at each side thereof, spaced, upstanding ears 44 are welded to the support 24. A lifting member 45 in the form of an inverted U, which may be termed a bail, is pivoted on bolts extending through the ears 44. Said member extends upwardly at each side of the tractor, being connected at the top forwardly of the housing 13 of the steering apparatus. At each side of the tractor, a lifting member 46 is also pivoted on the same axis as the lifting member 45. Each of said members 46 is connected at its upper end to a lifting link 47 in the form of a pipe extending longitudinally alongside the tractor to the rear end thereof. Said pipe at the rear end telescopically fits over a rod 48, which has a right angle end portion pivotally connected to a manually adjustable lever 49. Said lever is pivoted to a brake 50 secured to the tractor. A quadrant 51, also secured to the bracket 50, provides means for locking the lever 49 in any of its adjusted positions. It will be understood that the pipes 47 fit over the longitudinal portions of the rods 48, abutting the right angular end portions thereon to form stops, thereby limiting movement of the pipes to the rear while permitting free movement in a forward direction.

Links in the form of push rods 52 are connected to the pipes 47, extending angularly outwardly therefrom and being pivotally connected with the levers 43, previously described.

A transverse rod 53, secured at transversely aligned locations to the pipe 47 and the push rod 52, forms a support for pressure rods 54. Said rods are pivotally connected to the plates 37 on the implement carrying frame structure and slidably extend through bearing members 55 mounted on the bar 53. An adjustable stop 56, secured to the upper end of each of the pressure rods 54, provides a stop which engages the members 55 to limit downward movement of the implement and to provide a lifting means, as will be hereinafter described. Compression springs 57 abut the members 55 and adjustable stops 58 on the pressure rods 54. The compression of these springs regulates the downward spring pressure on the implement.

In order to show better the independent manual operation of the lifting connections, such operation will be described prior to any reference to the power lift mechanism. By moving the hand lever 49 forwardly, the operator moves the pipes 47 forwardly, rocking the levers 43 about their pivots and moving the rod 53 forwardly and upwardly somewhat, due to the arcs described by the pivot axes of the pipes 47 on the levers 43. The rods 54 then become lifting rods and move the implement structure upwardly with a substantially parallel movement in the specific construction disclosed. To lower the implement, the operator moves the levers 43 rearwardly.

A rearwardly mounted implement is also shown in Figures 1 and 2. The axle housings of the tractor, as illustrated, are formed with radial flanges 59, to which spaced plates 60 are secured. Said plates provide vertical and horizontal attaching surfaces to which implement supporting members 61 are attached by suitable bolts. Said members support rearwardly extending brackets 62 on which a rock-shaft 63 is mounted for angular movement on a transverse axis. Said rock-shaft has bent-up end portions 64. A manually adjustable lever 65 is rigidly connected to one of the end portions. Said lever is provided with a conventional latch mechanism to engage notches in a quadrant 66 secured to the bracket 62 at one side of the tractor.

The rock-shaft 63 is also provided with spring pressure links 68 connected to the end portions 64. Said links are of a conventional compression spring construction and are pivotally connected at their lower ends to a bracket 69 secured to a tool supporting bar 70. An earth working tool 71 is illustrated as being mounted on the bar 70. A beam 72, rigidly connected to the tool bar 70, is pivotally connected on a transverse axis to one of the attaching members 61, which extends downwardly to provide a suitable connection. It is to be understood that the entire structure across the rear of the tractor has not been shown, as it is desired to illustrate only an implement supporting means and a lifting connection therefor. The construction on the other side is the same as the construction shown in Figure 2 except that the adjusting lever is not present. As shown in Figure 1 and in detail in Figure 2, a sleeve 73 is journaled on the rock-shaft 63. Said sleeve is connected to a lever arm 74, at the end of which a trunnion member 75 is pivoted. A lifting link 76 slidably extends through said trunnion member and is formed with a collar 77 to form an abutment which engages the trunnion member 75 to apply positive lifting effort to the lifting rod 76. At the lower end, the lifting rod 76 is pivotally connected to an upstanding ear 78 carried rigidly with the tool bar 70.

A lifting cylinder 79 is mounted at the rear of the tractor with one end pivotally connected to a bracket 80 on the tractor. A piston rod 81, extending from the cylinder, is pivotally connected to the lever arm 74, as best shown in Figure 2.

Up to the present point the constructions of the two modifications shown, respectively, in Figures 1 to 4, inclusive, and in Figure 5, have been identical and the same numerals have been applied. It will be understood that the rear unit is the same for both modifications, the difference being in the mounting of the forward lifting cylinders, which will now be described for each modification.

In the modification shown in Figures 1 to 4, inclusive, a forwardly located lifting cylinder 82 is pivotally connected at one end to the ears 44 on the same axis as the lifting member 45 and the lifting member 46. The cylinder extends rearwardly and upwardly with its piston rod 83 being pivotally connected on a transverse axis to a bracket 84 slidably mounted on the pipe 47. A pressure link 85, pivotally connected to the bracket 84, is pivotally connected at its forward end to an attaching ear 86 secured to the bail 45. Said bail is provided with laterally extending plates or bars 87, best shown in Figure 4, positioned to engage the lifting members 46 upon rocking of the bail in a forward direction. It will then be understood that movement of the piston rod 83 in a forward direction, accomplished by a piston in the cylinder 82, will apply a compression force through the member 85, thereby rocking the bail 45 and raising the implement to a lifted position. During this movement the pipes 47 move away from the stops formed by the end portions of the rods 48. The end adjacent is, therefore, entirely independent and does not affect the power lift, the implements being raised to the same height, regardless of the depth adjustment, as determined by the setting of the hand levers 49. The implements at each side of the tractor are picked up and lifted as the bars 87 contact with the lifting levers 43, regardless of the angular position of said levers.

The sliding bracket 84 is provided because there is some relative movement of said bracket due to the connection points of the link 85. In this construction the lifting cylinder is entirely independent of the tractor. The fluid conduit 21 is connected, as shown, by a fitting 88 at the forward end of the cylinder 82. It is to be understood that this cylinder is of the pull type; that is, the piston rod 83 is withdrawn when fluid under pressure is applied to the end of the piston to which the rod is connected.

In the modification shown in Figure 5, a compression type cylinder 89 is utilized. Said cylinder is pivotally connected at its rear end to a bracket 90 connected to the side frame member 10 of the tractor. A piston rod 91 of the cylinder is directly pivoted to the ear 86 on the lifting bail 45. In other respects this modification is the same as that shown in Figures 1 to 4, inclusive.

In the modification shown in Figures 6 and 7, the pipes 47 and the lifting levers 43, as well as all of the implement parts, are the same and are identified by the same numerals. This modification differs, however, in the mounting of the lifting cylinder and the application of lifting effort as applied to the lifting connections at opposite sides of the tractor. The transverse rods 53 in this modification have extended end portions 92, which provide means for applying lifting effort through the power lift connections. A rock-shaft 93 is journaled on a transverse axis by means of aligned openings 94 provided in the attaching plates 23. At each end, the rock-shaft 93 is provided with upwardly extending lifting arms 95. Said arms, as illustrated in Figures 6 and 7, lie immediately at the rear of the extensions 92. An ear 97, welded to the lifting arm 95 at one side of the tractor, provides means for pivotally connecting the piston rod 98 extending from a hydraulically operated lifting cylinder 99. The rear end of said cylinder is pivoted on a supporting bar 100. Said bar extends forwardly and is connected to one of the plates 23. A link 101, also pivotally connected to the rear end of the cylinder 99, is pivotally connected to a bracket 102 secured to the tractor at the side of the engine, to form a support for the rear end of the cylinder. A fitting 103 connects the rear end of the cylinder, which is of the push type, with the fluid conduit 21.

The manual adjustment of the modification shown in Figures 6 and 7 is identical with that of the other modifications, and the structure is the same. A power lift device, as will be understood, is mounted entirely on the tractor and on the attaching plates 23, which are permanently secured to the tractor. When the implement is removed by disconnecting the attaching members 27 from the vertical plates 26, it is not necessary to remove or alter the power lift connections. A substitute implement can then be added to the tractor, which may also be provided with lifting members positioned to be engaged by the lifting arms of the rock-shaft 93. This is an important feature of the type of construction shown in Figures 6 and 7. This feature is particularly important with the use of hydraulic cylinders, as the removal of high pressure conduits and their reattachment when an implement is mounted creates a problem due to the danger of leaky connection and, of getting foreign material into the hydraulic lines.

It is to be understood that applicants' invention contemplates the use of any power lift mechanism with the linkage disclosed and, of the particular hydraulic type of lifting units with any linkage with which they can be utilized, which fall within the scope of the appended claims.

What is claimed is:

1. In a power lift device for tractors having tool supporting means at the forward end and an implement pivotally connected to said means at each side of the tractor, the combination of lifting means for each of said implements including an upwardly extending lever arm at each side of the tractor, a lifting member pivoted on the tractor and rockable to engage said lever arms, and a power operated lifting device supported on the tractor and having operating connections with the lifting member.

2. A power lift device for tractor attached implements comprising the combination with a tractor having a transverse tool support mounted at the forward end and implements pivotally connected to said support at each side of the tractor, of lifting means for each of said implements including an upwardly extending lever arm at each side of the tractor, a lifting member pivoted on the tractor and rockable to engage the lever arms, and a power operated lifting device supported on the tractor rearwardly of the transverse support and having operating connections with the lifting member.

3. A power lift device for tractor attached implements comprising the combination with a tractor having a transverse tool support mounted at the forward end thereof and an implement pivotally connected to said support, of lifting means for said implement including an upwardly extending lever arm and a longitudinal link extending to the rear of the tractor, said link being movable fore and aft to lift the implement, a lifting lever pivoted on the tractor and positioned to engage the lever arm, a hydraulic cylinder pivotally supported on the tractor rearwardly of the transverse support, a piston rod extending from said cylinder and pivotally connected to the lifting arm, and means for supporting the rear end of the longitudinal lifting member.

4. A power lift device for tractor attached implements comprising the combination with a tractor having a transverse tool support mounted at the forward end thereof and an implement pivotally connected to said support, of lifting means for said implement including an upwardly extending lever arm and a longitudinal link extending to the rear of the tractor, said link being movable fore and aft to lift the implement, a lifting lever pivoted on the tractor and positioned to engage the lever arm, a hydraulic cylinder pivotally supported on the tractor rearwardly of the transverse support, a piston rod extending from said cylinder and pivotally connected to the lifting arm, and means for supporting the rear end of the longitudinal lifting member including an adjustable stop for limiting movement of the member in one direction.

5. A power lift device for a tractor attached implement comprising forwardly extending implement supports at each side of the forward end of the tractor, a transverse implement support removably attached to said members, an implement pivotally carried by said support, lifting means for the implement including an upwardly extending lifting arm, a hydraulic cylinder pivotally mounted at one end on the tractor rearwardly of the lifting arm, a lifting member pivotally mounted on one of the forwardly extending supports, and a piston rod extending from said cylinder and being pivotally connected to the lifting member, said lifting member being engageable with the implement lifting arm and independent thereof whereby the implement may be removed without disconnecting the hydraulic cylinder.

6. A power lift device for a tractor attached implement comprising forwardly extending implement attaching members at each side of the front of the tractor, a transverse implement support removably attached to said members, an implement pivotally carried by said support, lifting means for the implement including an upwardly extending lifting arm carried on the implement support, a hydraulic cylinder pivotally mounted at one end on the tractor rearwardly of the lifting arm, a lifting member pivotally mounted on one of the attaching members, and a piston rod extending from said cylinder and being pivotally connected to the lifting member, said lifting member being engageable with the implement lifting arm and independent thereof whereby the implement support and the implement carried thereby may be removed without disconnecting the hydraulic cylinder.

7. In a tractor mounted implement, and in combination, a transverse front support connected to the tractor, an implement pivotally mounted on said support, lifting means for said implement including an upwardly extending lifting arm and a longitudinally extending member connected to said arm and extending to the rear of the tractor, a hydraulic cylinder pivotally connected to the implement support, a piston rod extending from said cylinder, a bracket slidably mounted on the longitudinal lifting member, said piston rod being pivotally connected to said bracket, a tension member connected to said bracket and to the lifting arm, supporting means for the rear end of the longitudinal lifting member, said means providing an adjustable stop for limiting movement of the implement in a downward direction.

8. A power lift device for tractor attached implements comprising the combination with a tractor having a transverse tool support mounted at the forward end thereof and implements pivotally connected to said support at each side of the tractor, of lifting means for each of said implements including an upwardly extending lever arm at each side of the tractor and a longitudinal link connected to said arm and extending to the rear of the tractor, a lifting member pivoted on the tractor and rockable to engage the lever arms, a hydraulic cylinder pivotally supported on the tractor rearwardly of the transverse support, a piston rod extending from said cylinder and pivotally connected to the lifting member, and means for supporting the rear end of the longitudinal lifting member including an adjustable stop whereby movement of the member in one direction may be regulated by the operator of the tractor.

9. A power lift device for tractor attached implements comprising the combination with a tractor having a transverse tool support mounted at the forward end thereof and implements pivotally connected to said support at each side of the tractor, of lifting means for each of said implements including an upwardly extending lever arm at each side of the tractor and a longitudinal link connected to said arm and extending to the rear of the tractor, a lifting member pivoted on the tractor and rockable to engage the lever arms, a hydraulic cylinder pivotally supported on the tractor rearwardly of the transverse support, a piston rod extending from said cylinder and pivotally connected to the lifting member, and means for supporting the rear end of the longitudinal lifting member including an adjustable stop whereby movement of the member in one direction may be regulated by the operator of the tractor.

10. In a tractor mounted implement and in combination, a transverse front support connected to the tractor, an implement pivotally mounted on said support, lifting means for said implement including an upwardly extending lifting arm and a longitudinally extending member connected to said arm and extending to the rear of the tractor, a hydraulic cylinder pivotally connected to the implement support, a piston rod extending from said cylinder, a bracket slidably mounted on the longitudinal lifting member, said piston rod being pivotally connected to said bracket, a tension member connected to said bracket and to the lifting arm, and supporting means for the rear end of the longitudinal lifting member, said means providing an adjustable stop for limiting movement of the implement in the downward direction.

11. A power lift device for a tractor attached implement comprising forwardly extending implement attaching members at each side of the front of the tractor, a transverse implement support removably attached to said members, an implement pivotally carried by said support, lifting means for the implement including an upwardly extending lifting arm mounted on the implement support, a lifting member pivotally mounted on one of the forwardly extending supports, a power operated lifting device mounted on the tractor and having an operating connection with said member, said lifting member being engageable with the implement lifting arm and independent thereof whereby the implement support and the implement carried thereby may be removed without disconnecting the hydraulic cylinder.

12. A power lift device for tractor attached implements comprising the combination with a tractor having a transverse tool support mounted at the forward end thereof and an implement pivotally connected to said support at each side of the tractor, of lifting means for each of said implements including an upwardly extending lever arm pivoted on the tool support and a longitudinal link connected to said arm and extending to the rear of the tractor, a lifting member rockably mounted on a transverse axis on the tractor, said member having a lifting lever at each side of the tractor engageable with the lifting means at each side of the tractor, a power operated lifting unit supported on the tractor rearwardly of the transverse support, a power transmitting connection between said device and the lifting member, and means for supporting the rear ends of the longitudinal lifting members.

13. A power lift device for tractor attached implements comprising the combination with a tractor having a transverse tool support mounted at the forward end thereof and an implement pivotally connected to said support at each side of the tractor, of lifting means for each of said implements including an upwardly extending lever arm pivoted on the tool support and a longitudinal link connected to said arm and extending to the rear of the tractor, a lifting member rockably mounted on a transverse axis on the tractor, said member having a lifting lever at each side of the tractor engageable with the lifting means at each side of the tractor, a hydraulic cylinder pivotally supported on the tractor rearwardly of the transverse support, a piston rod extending from said cylinder and pivotally connected to the lifting member, and means for supporting the rear ends of the longitudinal lifting members.

14. A power lift device for tractor attached implements comprising the combination with a tractor having a transverse tool support mounted at the forward end thereof and an implement pivotally connected to said support at each side of the tractor, of lifting means for each of said implements including an upwardly extending lever arm pivoted on the tool support and a longitudinal link connected to said arm and extending to the rear of the tractor, a lifting member rockably mounted on a transverse axis on the tractor, said member having a lifting lever at each side of the tractor engageable with the lifting means at each side of the tractor, a power operated lifting device supported on the tractor rearwardly of the transverse support, a power transmitting member connected to said device and pivotally connected to the lifting member, and means for supporting the rear ends of the longitudinal lifting members including manually adjustable stops whereby movement of the member in one direction may be regulated independently of the power lift adjustment.

15. The combination with a tractor having soil engaging units supported on the forward portion of the tractor at each side and adjusting means for said units including lift bars extending rearwardly from the units and connected to manual adjusting elements on the rear portion of the tractor; of fluid actuated expansible means associated with the adjusting means and operable to shift the lift bars longitudinally independently of the manual adjusting elements, and fluid supply means including valve control means adjacent the manual adjusting elements for governing the fluid pressure in said expansible means.

16. The combination with a tractor having soil engaging units supported on the forward portion of the tractor at each side and adjusting means for said units including lift bars extending longitudinally of the tractor rearwardly from the units; of manual adjusting elements on the rear portion of the tractor operatively connected to said lift bars, fluid actuated expansible means associated with the adjusting means and operable to shift the lift bars longitudinally of the tractor independently of the manual adjusting elements, and fluid supply means including valve control means on the tractor adjacent the manual adjusting elements for governing the fluid pressure in said expansible means.

17. The combination with a tractor having soil engaging units supported on the forward portion of the tractor at each side and adjusting means for said units including lift bars extending rearwardly from the units; of manual adjusting means on the rear portion of the tractor at each side thereof, said means including stops engageable by said bar to limit movement in one direction, fluid actuated expansible means associated with the adjusting means and operable to shift the lift bars longitudinally independently of the manual adjusting elements, and fluid supply means including valve control means on the tractor adjacent the manual adjusting elements for governing the fluid pressure in said expansible means.

18. The combination with a tractor having soil engaging units supported on the forward portion of the tractor at each side and adjusting means for said units including lift bars extending rearwardly from the units; of manual adjusting means on the rear portion of the tractor at each side thereof, said means including stops engageable by said bar to limit movement in one direction, fluid actuated expansible means associated with the adjusting means and operable to simultaneously shift the lift bars longitudinally independently of the manual adjusting elements, and fluid supply means including valve control means on the tractor adjacent the manual adjusting elements for governing the fluid pressure in said expansible means.

ALEXUS C. LINDGREN.
CARL W. MOTT.